US008786493B2

(12) United States Patent
Pu et al.

(10) Patent No.: US 8,786,493 B2
(45) Date of Patent: Jul. 22, 2014

(54) ANTENNA SYSTEM WITH A BEAM WITH AN ADJUSTABLE TILT

(71) Applicant: Huawei Technologies Co., Ltd., Shenzhen (CN)

(72) Inventors: Tao Pu, Shanghai (CN); Pinghua He, Shenzhen (CN); Mengda Mao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/725,373

(22) Filed: Dec. 21, 2012

(65) Prior Publication Data

US 2013/0229308 A1 Sep. 5, 2013

Related U.S. Application Data

(63) Continuation of application No. PCT/CN2012/071941, filed on Mar. 5, 2012.

(51) Int. Cl.

*H01Q 3/40* (2006.01)
*H01Q 3/26* (2006.01)
*H04W 16/28* (2009.01)

(52) U.S. Cl.

USPC ......................... 342/373; 342/372; 455/562.1

(58) Field of Classification Search

USPC ........................ 342/372–373; 455/562.1, 446
IPC .... H01Q 3/26,3/267, 3/30, 3/40; H04Q 7/3615; H04W 16/28
See application file for complete search history.

(56) References Cited

U.S. PATENT DOCUMENTS 5,305,009 A * 4/1994 Goutzoulis et al. ........... 342/157
5,434,575 A * 7/1995 Jelinek et al. ................. 342/365

(Continued)

FOREIGN PATENT DOCUMENTS

CN 1514514 A 7/2004
CN 1553725 A 12/2004

(Continued)

OTHER PUBLICATIONS

D. Parker et al., Phased arrays-part I: theory and architectures, IEEE Transactions on Microwave Theory and Techniques, vol. 50(3), p. 678-687, Mar. 2002.*
English translation of CN 101707497 A.*

(Continued)

*Primary Examiner* — Gregory C Issing
*Assistant Examiner* — Fred H Mull
(74) *Attorney, Agent, or Firm* — Brinks Gilson & Lione

(57) ABSTRACT

An antenna system with a beam with an adjustable tilt, including: a transceiver (TRX) array module, an antenna element array module, a feeding network module and a Butler matrix module, is provided. The TRX array module includes multiple active TRX submodules and is configured to generate transmission signals that have undergone digital beam forming. The antenna element array module includes multiple antenna elements and is configured to transmit the transmission signals. The feeding network module is configured to form a vertical beam characteristic of the antenna element array module before the antenna element array module transmits the transmission signals. The Butler matrix module is configured to form a horizontal beam characteristic of the antenna element array module before the antenna element array module transmits the transmission signals. The antenna system reduces the feeder loss, reduces the labor and equipment costs, and enables the vertical and horizontal beam characteristics of the antenna to be adjusted more conveniently.

16 Claims, 5 Drawing Sheets

(56) References Cited

U.S. PATENT DOCUMENTS

| | | | | |
|---|---|---|---|---|
| 6,340,948 | B1 * | 1/2002 | Munoz-Garcia et al. | 342/373 |
| 6,674,410 | B1 * | 1/2004 | Davidovitz | 343/850 |
| 6,785,558 | B1 * | 8/2004 | Stratford et al. | 455/561 |
| 7,570,210 | B1 * | 8/2009 | Nabar et al. | 342/373 |
| 2003/0038752 | A1 * | 2/2003 | Park | 343/757 |
| 2004/0127174 | A1 * | 7/2004 | Frank et al. | 455/101 |
| 2004/0160374 | A1 | 8/2004 | Johansson et al. | |
| 2005/0012665 | A1 * | 1/2005 | Runyon et al. | 342/372 |
| 2008/0119149 | A1 * | 5/2008 | Li et al. | 455/187.1 |
| 2009/0289864 | A1 | 11/2009 | Derneryd et al. | |
| 2010/0225539 | A1 * | 9/2010 | Margomenos et al. | 342/373 |

FOREIGN PATENT DOCUMENTS

| | | | | |
|---|---|---|---|---|
| CN | 1748340 | A | | 3/2006 |
| CN | 101076923 | A | | 11/2007 |
| CN | 101707497 | A | * | 5/2010 |
| CN | 101848471 | A | | 9/2010 |
| CN | 201608276 | U | | 10/2010 |
| CN | 102064379 | A | | 5/2011 |
| JP | 59044105 | A | | 3/1984 |

OTHER PUBLICATIONS

J. De Los Santos, Introduction to Microelectromechanical (MEM) Microwave Systems, Artech House, p. 159-195, 1999.*

* cited by examiner

ANTENNA SYSTEM WITH A BEAM WITH AN ADJUSTABLE TILT

CROSS-REFERENCE TO RELATED APPLICATIONS

This application is a continuation of International Application No. PCT/CN2012/071941, filed on Mar. 5, 2012, which is hereby incorporated by reference in its entirety.

FIELD OF THE INVENTION

The present invention relates to the field of radio communications, and in particular, to an antenna system of a base station.

BACKGROUND OF THE INVENTION

An antenna of a base station is used to transform radio frequency signals into electromagnetic wave signals, and radiate the electromagnetic wave signals to the space; or receive electromagnetic wave signals transmitted from a terminal, transform the electromagnetic wave signals into radio frequency signals and deliver the radio frequency signals to the base station.

Each antenna controls a certain range of area, and the area is referred to as a sector or a cell. Electromagnetic waves are radiated or received in the area, and a radiation radius is controlled by using a method for controlling a tilt angle of a main lobe. The larger the tilt angle of the main lobe is, the smaller the radiation radius is. The sector coverage area of the cell is controlled by controlling the horizontal direction of the main lobe of the antenna.

The following are several manners to tilt the main lobe:

1. Install the antenna in a tilt status. The formed direction of the main lobe, also known as the tilt angle, has already been fixed in design, which is referred to as fixed electrical tilt (FET, Fixed Electrical Tilt). The tilt angle cannot be changed unless an operator climbs up the tower of the base station to adjust or change an installation support.

2. Dispose a phase shifter inside the antenna, so that the antenna becomes a manual electrical tilt (MET, Manual Electrical Tilt) antenna. When the tilt angle needs to be changed, an operator needs to climb up the tower to adjust the phase shifter, which is also quite inconvenient.

3. Add a motor device on the basis of the antenna in the manner 2, being used for remote control. The antenna of the base station is referred to as a remote electrical tilt (RET, Remote Electrical Tilt) antenna. The hardware increases costs. Besides, the electrical tilt in such manner cannot be separately configured according to different carrier waves and different channels, so the flexibility is limited.

A multi-beam antenna refers to that the excitation for an antenna array is weighted by amplitude and a phase with a certain relationship, making the antenna direct to different directions to form multiple narrow beams. By adjusting the vertical characteristic of the beams, the antenna obtains good side lobe suppression and a desirable tilt angle in the vertical direction. In the same sector, a multi-beam antenna may be applied to make received signals the strongest by determining to select different corresponding beams. In addition, the multi-beam antenna may be used as a sector splitter to split a sector into two sectors, so that an overlapping area between the two sectors is smaller, which is conducive to reduce soft handover and softer handover, and increase the system capacity to enhance capacity.

The existing multi-beam antenna with an adjustable tilt angle is connected to a transceiver (Transceiver, TRX for short) module through a feeder line. In the connection, transmission loss exists. Besides, a discrete component increases the equipment costs, and also increases the labor costs of maintenance.

SUMMARY OF THE INVENTION

The present invention provides an antenna system, which can reduce the costs.

In an aspect, an antenna system is provided, which includes: a TRX array module, an antenna element array module, a feeding network module and a Butler matrix module. The TRX array module includes multiple active TRX submodules and is configured to generate transmission signals that have undergone digital beam forming. The antenna element array module includes multiple antenna elements and is configured to transmit the transmission signals. The feeding network module is configured to form a vertical beam characteristic of the antenna element array module before the antenna element array module transmits the transmission signals. The Butler matrix module is configured to form a horizontal beam characteristic of the antenna element array module before the antenna element array module transmits the transmission signals.

In another aspect, a base station is provided, which includes the above antenna system.

In another aspect, a system is provided, which includes the above base station.

The antenna system provided by the foregoing technical solution uses an AAS antenna as a basic architecture. Compared with the conventional antenna, the antenna system reduces the feeder loss, reduces the labor and equipment costs, enables the vertical and horizontal beam characteristics of the antenna to be adjusted more conveniently, and also has a certain advantage on the spectrum resource utilization rate.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

To illustrate the technical solutions in the embodiments of the present invention more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

Figure 1:
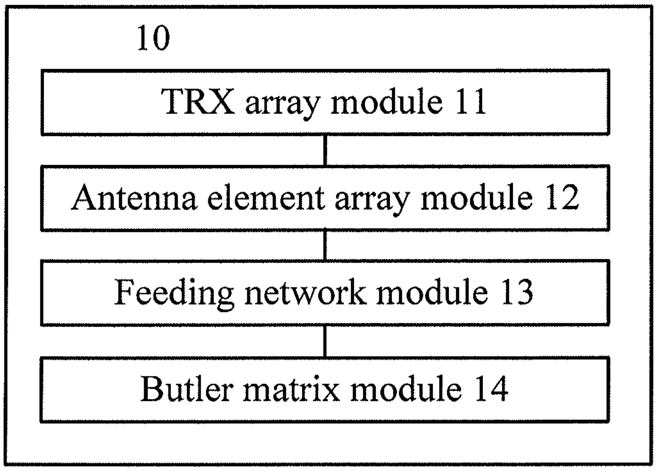
FIG. 1 is a schematic block diagram of an antenna system according to an embodiment of the present invention.

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

The technical solutions provided by the embodiments of the present invention may be applied in various communication systems, such as a global system for mobile communication (GSM, Global System for Mobile Communication) system, a code division multiple access (CDMA, Code Division Multiple Access) system, a wideband code division multiple access wireless (WCDMA, Wideband Code Division Multiple Access Wireless) system, a general packet radio service (GPRS, General Packet Radio Service) system, and a long term evolution (LTE, Long Term Evolution) system.

A user equipment (UE, User Equipment), which may also be referred to as a mobile terminal (Mobile Terminal) or a mobile user equipment, may perform communication with one or more core networks through a wireless access network (for example, RAN, which is short for Radio Access Network). The user equipment may be a mobile terminal such as a mobile phone (or referred to as a "cellular" phone) and a computer with a mobile terminal, and for example, may be a portable, pocket-size, handheld, computer-integrated or vehicle-mounted mobile apparatus, and the user equipment exchanges languages and/or data with the wireless access network.

A base station may be a base transceiver station (BTS, Base Transceiver Station) in GSM or CDMA, or a NodeB (NodeB) in WCDMA, or an evolutional NodeB (eNB or e-NodeB, evolutional NodeB) in LTE, which is not limited in the present invention. But for the convenience of description, the following embodiments take the NodeB as an example for illustration.

Further, the terms "system" and "network" in this document may always be exchanged for use in this document. The term "and/or" in this document is used to describe a relationship of associated objects, and indicates that three relationships may exist, for example, A and/or B may represent the following three cases: A exists only, and both A and B exist, and B exists only. In addition, the character "/" in this document usually represents that the former and later associated objects are in an "or" relationship.

It should be noted that, in the following description, when two components are "connected", the two components may be directly connected, or indirectly connected through one or more intermediate components. The connection manner of the two components may include a contact manner or a non-contact manner. Persons skilled in the art may perform equivalent replacement or modification on the connection manners described in the following examples, and the replacement or modification falls within the scope of the present invention.

An AAS (Active Antenna System, active antenna system) refers to an antenna with an active device, that is, an antenna integrated with an active TRX submodule therein.

The antenna system provided by the embodiment of the present invention uses an AAS antenna as a basic architecture. Compared with the conventional antenna, the antenna system reduces the feeder loss, reduces the labor and equipment costs, enables the beam of the antenna to be adjusted more conveniently, and also has a certain advantage on the spectrum resource utilization rate.

FIG. 1 is a schematic block diagram of an antenna system 10 according to an embodiment of the present invention. The antenna system 10 includes a TRX array module 11, an antenna element array module 12, a feeding network module 13 and a Butler matrix module 14.

The TRX array module 11 includes multiple active TRX submodules and is configured to generate transmission signals that have undergone digital beam forming. The TRX array module 11 includes M×N active TRX submodules, and the active TRX submodules generate transmission signals which are transmitted through the antenna element array module. M and N indicate the numbers of the active TRX submodules in the horizontal direction and the vertical direction of an antenna respectively, and are positive integers greater than or equal to 2. The TRX array module 11 may also be configured to process received signals, and the processing of the received signals is an approximately reverse process of the processing of the transmission signals, which is not described herein again.

The antenna element array module 12 transmits the transmission signals. The antenna element array module 12 includes A×B antenna elements, and radiates the transmission signals in the form of electromagnetic waves. A and B indicate the horizontal direction and the vertical direction of the antenna respectively, and are positive integers greater than or equal to 2. The antenna element array module 12 may also be configured to receive signals, and the receiving of the signals is an approximately reverse process of the transmitting of the signals, which is not described herein again.

The feeding network module 13 forms a vertical beam characteristic of the antenna element array module before transmitting the transmission signals. The vertical beam characteristic refers to a characteristic related to the shape of the beam in the vertical plane, which may include the lobe width, the beam direction, and/or the side lobe of the beam in the vertical plane. The feeding network module 13 has multiple inputs and multiple outputs, and serves as a combining and dividing network capable of dividing the input transmission signals. For example, a dividing unit in the feeding network module 13 divides an input transmission signal into two signals with a power ratio of 1:1, or into two signals with a power ratio of 4:1. Therefore, the characteristic such as the lobe width or the side lobe in the vertical plane of the beam transmitted by the antenna may be affected. Compared with a phase shifter in an MET or RET antenna, the multiple inputs of the feeding network module 13 can but not limited to be separately configured according to different carrier frequencies and different channels, and the vertical plane can be adjusted more flexibly. The feeding network module 13 may also be configured to process received signals, and the processing of the received signals is an approximately reverse process of the processing of the transmission signals, which is not described herein again.

The Butler matrix module 14 forms a horizontal beam characteristic of the antenna element array module before transmitting the transmission signals. The horizontal beam characteristic refers to a characteristic related to the shape of the beam in the horizontal plane, which may include the lobe width, the beam direction, and/or the side lobe of the beam in the horizontal plane. The Butler matrix module 14 may provide a multi-beam function of the antenna in the horizontal plane, has multiple inputs and multiple outputs, and connects the multiple inputs to the antenna elements through the combining and dividing network, to eventually make each output direct to different directions. The Butler matrix module 14 may also be configured to process received signals, and the processing of the received signals is an approximately reverse process of the processing of the transmission signals, which is not described herein again.

An antenna system may include the above four modules at the same time to form a compact structure, so as to reduce the equipment costs.

For simplicity, taking the transmission direction as an example, in the embodiment of the present invention, the short-distance connection between the modules of the antenna system 10 reduces the feeder loss, as compared with the scenario in the prior art that the antenna system is connected to a TRX submodule through a long feeder line.

Besides, the multiple transmission signals output by the TRX array module 11 are processed by digital beam forming to form the vertical beam characteristic and the horizontal beam characteristic of the antenna element array module. By performing the digital beam forming on the transmission signals, the TRX array module 11 may implement the adjustability of the tilt angle of the beam in the vertical plane of the antenna, and also may implement the beam forming in the horizontal plane of the antenna. The method of digital adjustment of the vertical beam characteristic and the horizontal beam characteristic is flexible, simple and convenient, and may reduce the labor costs. At the same time, the vertical beam characteristic of the antenna element array module 12 may be further adjusted through the feeding network module 13, and the horizontal beam characteristic of the antenna element array module 12 may be further adjusted through the Butler matrix module 14. The embodiment of the present invention provides two manners: digital adjustment and analog adjustment, which enable the vertical beam characteristic and the horizontal beam characteristic to be judged more conveniently.

Furthermore, the antenna system includes at least 2×2 active TRX submodules, and forms at least four multi-beams. Different multi-beams cover different areas, and thereby the spectrum utilization rate may be improved. Besides, each transmission signal output by the active TRX submodule may include one or more signal components, and each signal component is processed by the digital beam forming.

The antenna system provided by the embodiment of the present invention uses an AAS antenna as a basic architecture. Compared with the conventional antenna, the antenna system reduces the feeder loss, reduces the labor and equipment costs, enables the vertical and horizontal beam characteristics of the antenna to be adjusted more conveniently, and also has a certain advantage on the spectrum resource utilization rate.

Figure 2:
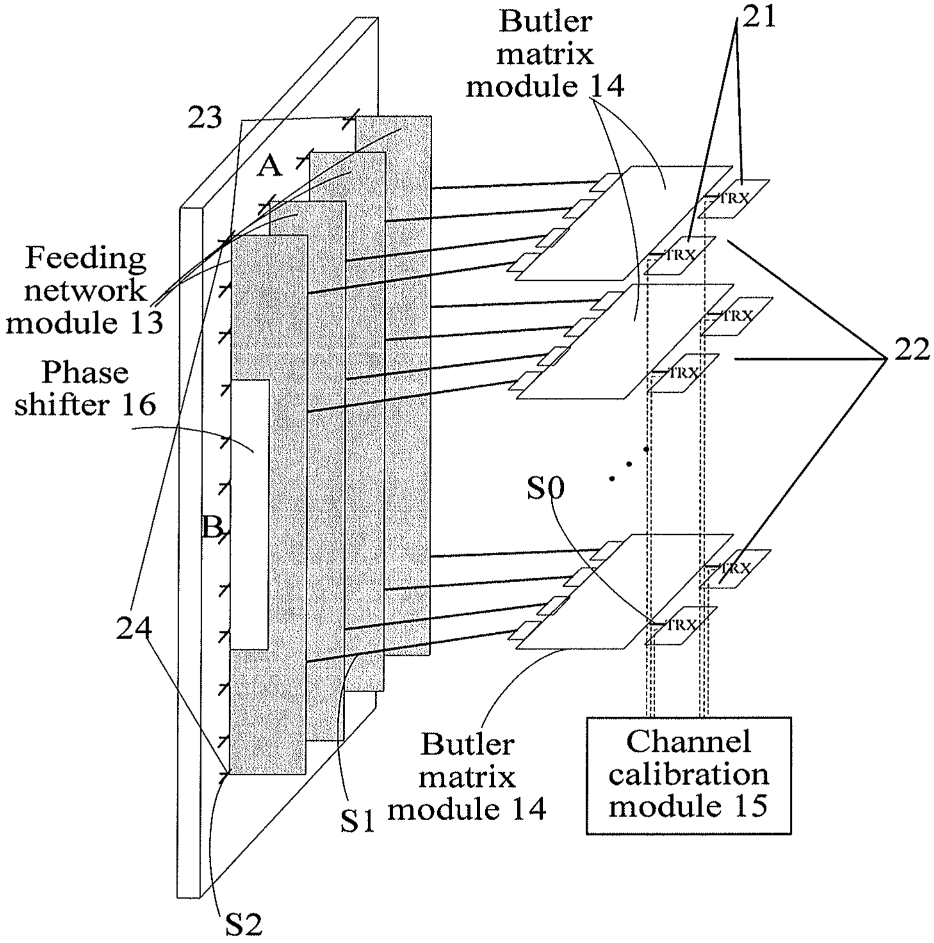
FIG. 2 is a schematic diagram of an antenna system according to another embodiment of the present invention.

FIG. 2 is a schematic diagram of the connection among modules in an antenna system 20 according to another embodiment of the present invention.

As shown in FIG. 2, the antenna system 20 includes a TRX array module 11, an antenna element array module 12, a feeding network module 13 and a Butler matrix module 14. Different from the antenna system 10, the antenna system 20 further includes a channel calibration module 15 and a phase shifter 16.

When the TRX array module includes M×N active TRX submodules and the number of the antenna element array modules is A×B, the antenna system includes N Butler matrix modules and the feeding network modules the number of which is the same as that of output ports of one Butler matrix module, the total number of input ports of the feeding network modules is equal to the total number of the output ports of the Butler matrix modules, the number of input ports of each Butler matrix module is equal to M, the number of the input ports of each feeding network module is equal to N and the number of output ports of each feeding network module is equal to B, where M is the number of the active TRX submodules in the horizontal direction of an antenna, N is the number of the TRX submodules in the vertical direction of the antenna, A is the number of elements in the horizontal direction of the antenna, B is the number of elements in the vertical direction of the antenna, A≥M, B≥N, and A, B, M and N are positive integers greater than or equal to 2.

In FIG. 2, 21 indicates M active TRX submodules of the TRX array module 11 in the horizontal direction, and 22 in FIG. 2 indicates N active TRX submodules of the TRX array module 11 in the vertical direction. Generally, the Butler matrix module 14 has multiple inputs and multiple outputs. Each active TRX submodule is connected to an input end of the Butler matrix module 14. If a minimum number of the Butler matrix modules are used to reduce the hardware costs and achieve a simple structure, in this case, at least N Butler matrix modules are needed, and each Butler matrix module has M input ports. An output end of the Butler matrix module 14 is connected to an input end of the feeding network module 13; therefore, at least multiple feeding network modules 13 the number of which is equal to that of the output ports of one Butler matrix module 14 are needed. The output end of the feeding network module 13 is connected to the antenna elements of the antenna element array module 12. As shown in FIG. 2, 23 in FIG. 2 is A antenna elements in the horizontal direction of the antenna element array module 12, and 24 in FIG. 2 is B antenna elements in the vertical direction of the antenna element array module 12. For the simplicity of the circuit, in this case, when each Butler matrix module 14 has A outputs, at least A feeding network modules 13 are needed, each feeding network module 13 has N inputs, and the total number of the inputs of the A feeding network modules 13 is equal to the total number of the outputs of the N Butler matrix modules, both of which are A×N.

For the convenience of illustration, the Butler matrix module 14 with two inputs and four outputs is shown. However, the present invention is not limited thereto. In this case, each of the N Butler matrix modules 14 receives two transmission signals S0 from the active TRX submodules in the horizontal direction, and outputs four first signals S1; the four first signals S1 are output as at least four second signals S2 through four feeding network modules 13, and the second signals S2 are radiated as electromagnetic waves through the antenna elements in the horizontal direction of the antenna element array module 12. Generally, the feeding network module 13 includes multiple input ports and multiple output ports, and the number of the input ports may be different from the number of the output ports.

The above illustration takes the transmission process as an example, and as a reverse process, the above connection relationships are still remained in the receiving process, which is not described herein again.

Optionally, the embodiment of the present invention further includes the channel calibration module 15. The channel calibration module 15 couples a part of the transmission signals from the transmission signals of the active TRX submodules of the TRX array module 11, and is configured to calibrate the amplitude-phase change brought by the channel difference between the active TRX submodules, so as to eliminate the channel difference.

Besides, optionally, the antenna system 20 may further include the phase shifter 16. The phase shifter 16 may be a unit separately set, or combined with the feeding network module 13. For the transmission signals radiated from the antenna system of the embodiment of the present invention, by adjusting the phase shifter 16, the flexibility may be increased in adjusting the tilt angle of the beam in the vertical direction, so as to compensate the transmission signals after being adjusted through the digital beam forming by the TRX array module 11.

It should be particularly noted that, a baseband signal input into the active TRX submodule may be a single signal component, or may include multiple signal components, and correspondingly, a transmission signal output by the active TRX submodule may be a single signal component, or may include multiple signal components, for example, the transmission signal including two signal components in the subsequent embodiments of the specification. The baseband signal has undergone the digital beam forming of the TRX array module, and when the transmission signal includes multiple signal components, the vertical beam characteristic of the antenna element array module may be adjusted for each signal component through the feeding network module 13. The baseband signal has undergone the digital beam forming of the TRX array module 11, and when the transmission signal includes multiple signal components, the horizontal beam characteristic of the antenna element array module may be adjusted simultaneously through the Butler matrix module 14.

The antenna system provided by the embodiment of the present invention uses an AAS antenna as a basic architecture. Compared with the conventional antenna, the antenna system reduces the feeder loss, reduces the labor and equipment costs, enables the vertical and horizontal beam characteristics of the antenna to be adjusted more conveniently, and also has a certain advantage on the spectrum resource utilization rate.

Figure 3:
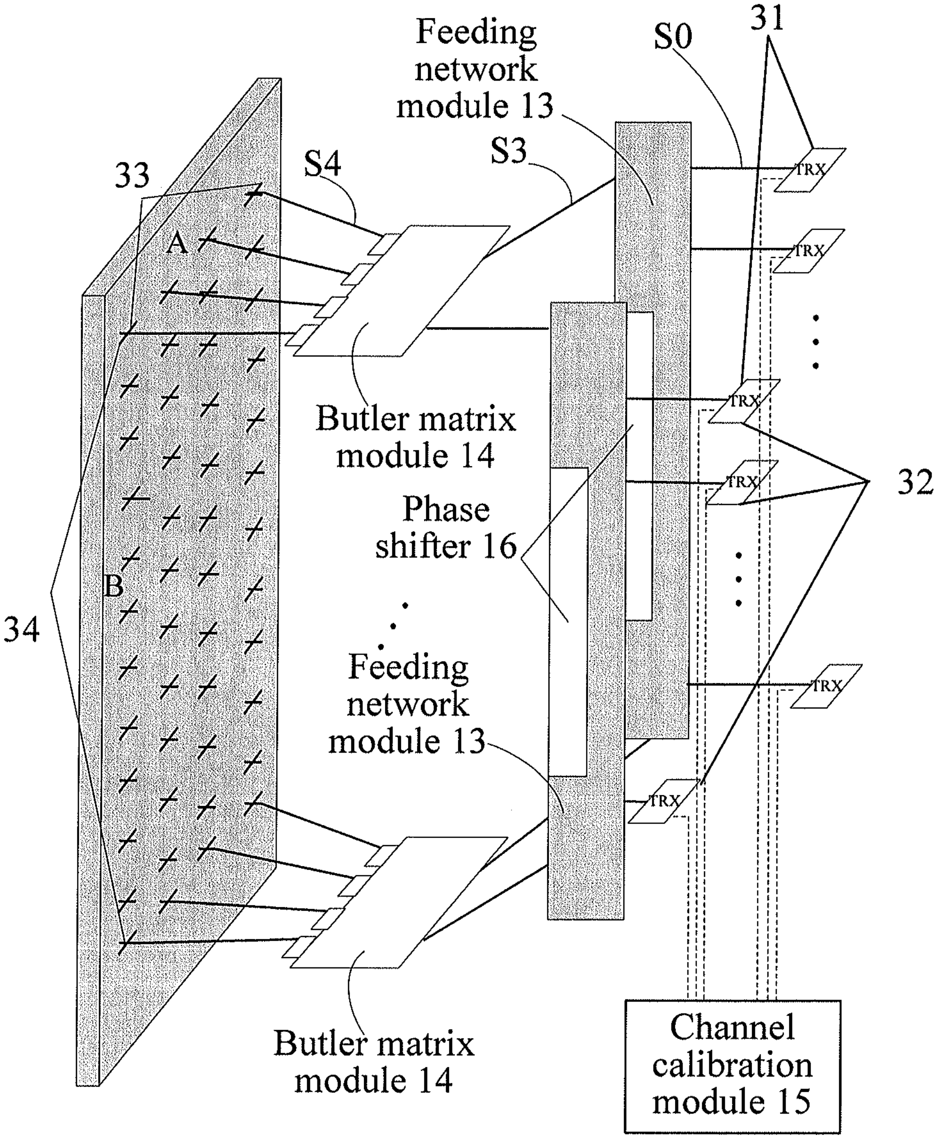
FIG. 3 is a schematic diagram of an antenna system according to another embodiment of the present invention.

Different from the antenna system 20 in FIG. 2, FIG. 3 is a schematic diagram of the connection among modules in an antenna system 30 according to another embodiment of the present invention.

As shown in FIG. 3, the antenna system 30 includes a TRX array module 11, an antenna element array module 12, a feeding network module 13 and a Butler matrix module 14. Different from the antenna system 10, the antenna system 30 also includes a channel calibration module 15 and a phase shifter 16.

When the TRX array module includes M×N active TRX submodules and the number of the antenna element array modules is A×B, the antenna system includes M feeding network modules and the Butler matrixes of which the number is the same as that of output ports of one feeding network module, the total number of input ports of the Butler matrix modules is equal to the total number of the output ports of the feeding network modules, the number of input ports of each feeding network module is equal to N, the number of the input ports of each Butler matrix module is equal to M and the number of output ports of each Butler matrix module is equal to A, where M is the number of the active TRX submodules in the horizontal direction of an antenna, N is the number of the active TRX submodules in the vertical direction of the antenna, A is the number of elements in the horizontal direction of the antenna, B is the number of elements in the vertical direction of the antenna, A≥M, B≥N, and A, B, M and N are positive integers greater than or equal to 2.

31 in FIG. 3 is M active TRX submodules of the TRX array module 11 in the horizontal direction, and 32 in FIG. 3 is the active TRX submodules of the TRX array module 11 in the vertical direction. Each active TRX submodule is connected to an input of the feeding network module 13. In this case, at least M feeding network modules are needed, and each feeding network module at least has N inputs.

The output end of the feeding network module 13 is connected to the input end of the Butler matrix module 14. If a minimum number of the Butler matrix modules are used to reduce the hardware costs and achieve a simple structure, N Butler matrix modules 14 are needed, and each Butler matrix module 14 has M input ports. The output end of the Butler matrix module 14 is connected to the antenna elements of the antenna element array module 12. As shown in FIG. 3, 33 in FIG. 3 is A antenna elements in the horizontal direction of the antenna element array module 12, and 34 in FIG. 3 is B antenna elements in the vertical direction of the antenna element array module 12. For the consideration of reducing the hardware costs and achieving a simple structure, in this case, Butler matrix modules 14 the number of which is the same as that of the output ports of one feeding network module 13 are needed, the total number of the input ports of all the Butler matrix modules 14 is equal to the total number of the output ports of the M feeding network modules 13, and the number of the output ports of one Butler matrix module is equal to A, where A may be greater than or equal to the number of the output ports of each Butler matrix module 14 and B may be greater than or equal to N.

For the convenience of illustration, the Butler matrix module 14 with two inputs and four outputs is shown. However, the present invention is not limited thereto. In this case, when M=N=2, A=4, B=12, and each feeding network module 13 includes two input ports and six output ports, two feeding network modules 13 and six Butler matrix modules 14 are needed. When the antenna system includes one 2×2 TRX array module 11, one 4×12 antenna element array module 12, two feeding network modules 13 and six Butler matrix modules 14, where the number of the input ports of each feeding network module 13 is 2 and the number of the output ports of each feeding network module is 6, and the number of the input ports of each Butler matrix module 14 is 2 and the number of the output ports of each Butler matrix module is 4, the coverage effect of the antenna system of the structure is desirable. First inputs of the two feeding network modules 13 respectively receive two transmission signals S0 from the TRXs in the horizontal direction, and output two third signals S3; the two third signals S3 are output as four fourth signals S4 through one Butler matrix module 14, and the four fourth signals S4 are radiated into electromagnetic waves through the antenna elements in the horizontal direction of the antenna element array module 12. Each fourth signal S4 may be radiated into the electromagnetic wave through a power splitter in a vector connection manner and then through multiple antenna elements in the vertical direction of the antenna element array module 12, thereby further saving the number of the Butler matrix modules 14 and reducing the hardware costs.

The above illustration takes the transmission process as an example, and as a reverse process, the connection relationships in the embodiment of the present invention are still remained in the receiving process, which is not described herein again.

Optionally, the embodiment of the present invention further includes the channel calibration module 15. The channel calibration module 15 couples a part of the transmission signals from the transmission signals of the active TRX submodules of the TRX array module 11, and is configured to calibrate the amplitude-phase change brought by the channel difference between the active TRX submodules, so as to eliminate the channel difference.

Besides, optionally, the antenna system 30 may further include the phase shifter 16. The phase shifter 16 may be a unit separately set, or combined with the feeding network module 13. For the transmission signals radiated from the antenna system of the embodiment of the present invention, by adjusting the phase shifter 16, the flexibility may be increased in adjusting the tilt angle of the beam in the vertical direction, so as to compensate the transmission signals after being adjusted through the digital beam forming by the TRX array module 11.

Figure 6:
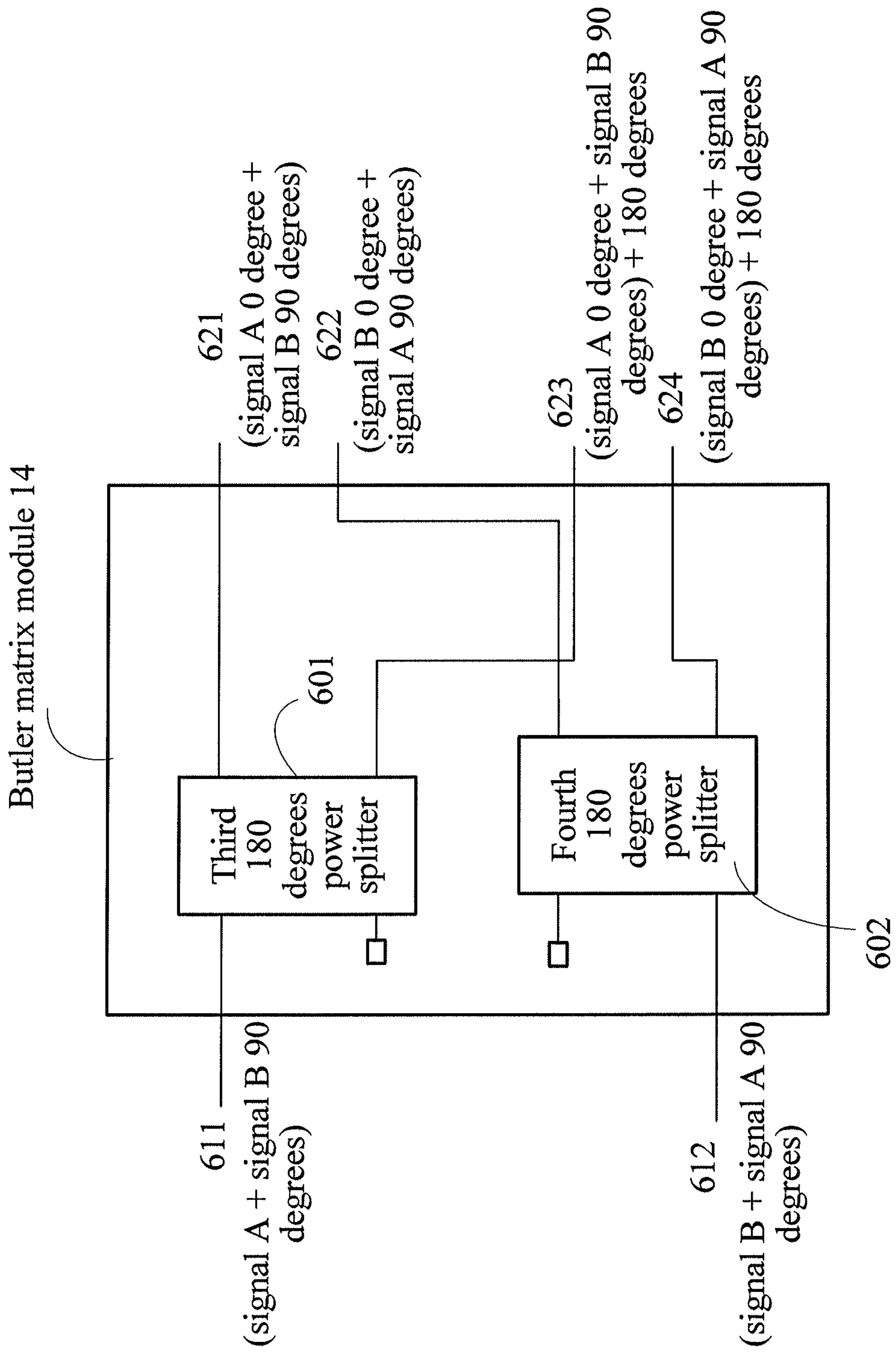
FIG. 6 is a schematic diagram of another example of a Butler matrix module according to an embodiment of the present invention.

It should be particularly noted that, a baseband signal input into the active TRX submodule may be a single signal component, or may include multiple signal components, and correspondingly, a transmission signal output by the active TRX submodule may be a single signal component, or may include multiple signal components, for example, the transmission signal including two signal components in the embodiment of FIG. 6 in the specification. The baseband signal has undergone the digital beam forming of the TRX array module, and when the transmission signal includes multiple signal components, the vertical beam characteristic of the antenna element array module may be adjusted simultaneously through the feeding network module 13. The baseband signal has undergone the digital beam forming of the TRX array module 11, and when the transmission signal includes multiple signal components, the horizontal beam characteristic of the antenna element array module may be adjusted for each signal component through the Butler matrix module 14.

The antenna system provided by the embodiment of the present invention uses an AAS antenna as a basic architecture. Compared with the conventional antenna, the antenna system reduces the feeder loss, reduces the labor and equipment costs, enables the vertical and horizontal beam characteristics of the antenna to be adjusted more conveniently, and also has a certain advantage on the spectrum resource utilization rate.

Figure 4:
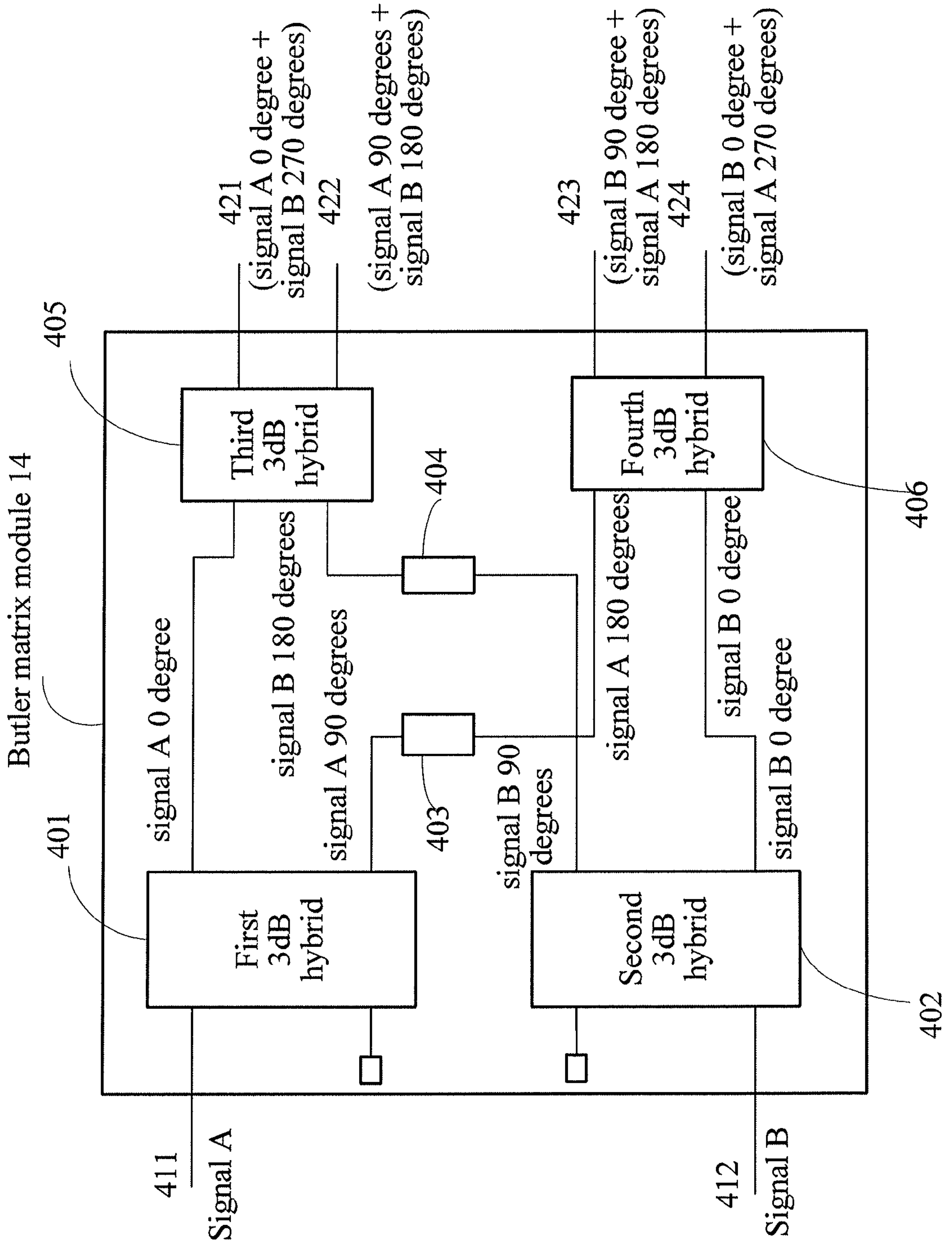
FIG. 4 is a schematic diagram of an example of a Butler matrix module according to an embodiment of the present invention.
Figure 5:
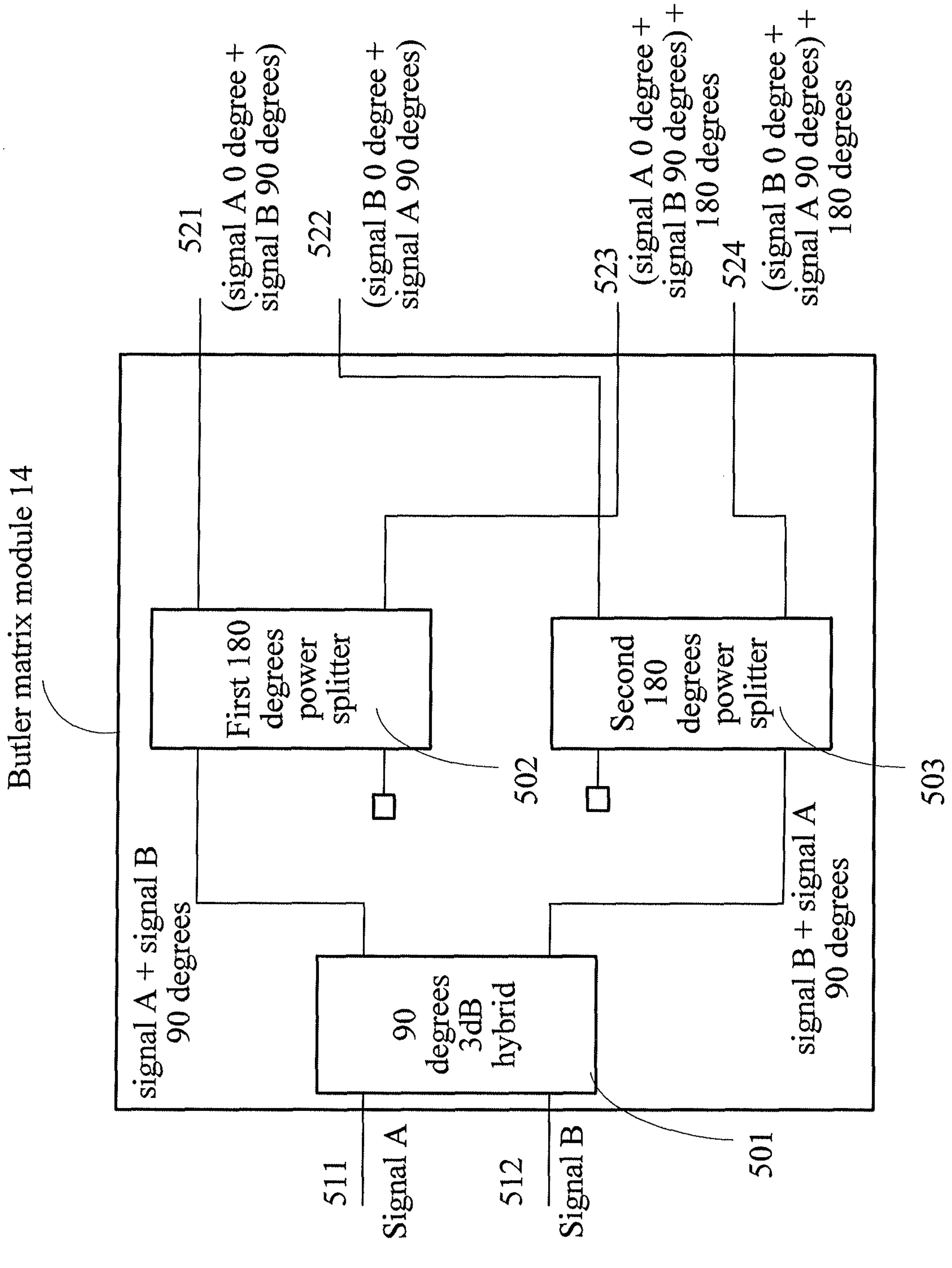
FIG. 5 is a schematic diagram of another example of a Butler matrix module according to an embodiment of the present invention.

For the Butler matrix module of the antenna system 20, 30 or 40 in the above embodiment, taking the Butler matrix module with two inputs and four outputs as an example, FIG. 4 to FIG. 6 respectively show different implementation manners. FIG. 4 is a schematic diagram of an example of the Butler matrix module according to an embodiment of the present invention.

As shown in FIG. 4, the Butler matrix module 14 includes a first input 411, a second input 412 and a first output 421 to a fourth output 424, a first 3 dB hybrid 401, a second 3 dB hybrid 402, a third 3 dB hybrid 405 and a fourth 3 dB hybrid 406, and a first phase shifter 403 and a second phase shifter 404.

The first input 411 and the second input 412 of the Butler matrix module 14 are connected to a first input of the first 3 dB hybrid 401 and a first input of the second 3 dB hybrid 402 respectively.

A first output of the first 3 dB hybrid 401 is connected to a first input of the third 3 dB hybrid 405, and a second output of the first 3 dB hybrid is connected to the first phase shifter 403.

A first output of the second 3 dB hybrid is connected to the second phase shifter 404, and a second output of the second 3 dB hybrid 402 is connected to a first input of the fourth 3 dB hybrid 406.

A first output of the third 3 dB hybrid 405 is connected to the first output 421 of the Butler matrix module 14, and a second output of the third 3 dB hybrid 405 is connected to the second output 422 of the Butler matrix module 14.

A first output and a second output of the fourth 3 dB hybrid 406 are connected to the third output 423 and the fourth output 424 of the Butler matrix module 14, respectively.

When signals being input into the first input and the second input of the Butler matrix module are different transmission signals, signals being output from the first output to the fourth output of the Butler matrix module are the corresponding first signals; or when signals being input into the first input and the second input of the Butler matrix module are different third signals, signals being output from the first output to the fourth output of the Butler matrix module are the corresponding fourth signals. Each transmission signal or each third signal includes a single signal component, such as a signal A or signal B shown in the figure.

For example, as shown in FIG. 4, the first output 421 is a signal including a signal A of 0 degree phase shifting and a signal B of 270 degrees phase shifting at the same time, which is represented as (signal A 0 degree+signal B 270 degrees) in the figure.

The second output 422 is a signal including a signal A of 90 degrees phase shifting and a signal B of 180 degrees phase shifting at the same time, which is represented as (signal A 90 degrees+signal B 180 degrees) in the figure.

The third output 423 is a signal including a signal B of 90 degrees phase shifting and a signal A of 180 degrees phase shifting at the same time, which is represented as (signal B 90 degrees+signal A 180 degrees) in the figure.

The fourth output 424 is a signal including a signal B of 0 degree phase shifting and a signal A of 270 degrees phase shifting at the same time, which is represented as (signal B 0 degree+signal A 270 degrees) in the figure.

It can be seen from FIG. 4 that, in the case of two input signals, one Butler matrix module outputs four signals, which include four types of phase shifted signals A and signals B. After the antenna element array module radiates the four output signals, four beams in different directions are formed. When the antenna system in the embodiment of the present invention includes multiple Butler matrix modules, more beams in different directions may be output. The above beams cover different areas, and thereby the frequency may be reused and the spectrum utilization rate may be effectively improved.

FIG. 5 is a schematic diagram of another example of the Butler matrix module 14 according to an embodiment of the present invention. The Butler matrix module 14 includes a 90 degrees 3 dB hybrid 501, a first 180 degrees power splitter 502 and a second 180 degrees power splitter 503.

A first input 510 and a second input 511 of the Butler matrix module 14 are connected to a first input and a second input of the 90 degrees 3 dB hybrid 501 respectively.

A first output of the 90 degrees 3 dB hybrid 501 is connected to a first input of the first 180 degrees power splitter 502, and a second output of the 90 degrees 3 dB hybrid 501 is connected to a first input of the second 180 degrees power splitter 503.

A first output and a second output of the first 180 degrees power splitter 502 are connected to a first output 521 and a third output 523 of the Butler matrix module respectively.

A first output and a second output of the second 180 degrees power splitter 503 are connected to a second output 522 and a fourth output 524 of the Butler matrix module, respectively.

When signals being input into the first input and the second input of the Butler matrix module are different transmission signals, signals being output from the first output to the fourth output of the Butler matrix module are the corresponding first signals; or when signals being input into the first input and the second input of the Butler matrix module are different third signals, signals being output from the first output to the fourth output of the Butler matrix module are the corresponding fourth signals. Each transmission signal or each third signal includes a single signal component, such as a signal A or signal B shown in the figure.

For example, as shown in FIG. 5, the first output 521 is a signal including a signal A of 0 degree phase shifting and a signal B of 90 degrees phase shifting at the same time, which is represented as (signal A 0 degree+signal B 90 degrees) in the figure.

The second output 522 is a signal including a signal B of 0 degree phase shifting and a signal A of 90 degrees phase shifting at the same time, which is represented as (signal B 0 degree+signal A 90 degrees) in the figure.

The third output 523 is a signal including (signal A 0 degree+signal B 90 degrees) after 180 degrees phase shifting, which is represented as (signal A 0 degree+signal B 90 degrees)+180 degrees, namely, the third output 523 is a signal including a signal A of 180 degrees and a signal B of 270 degrees at the same time.

The fourth output 524 is a signal including (signal B 0 degree+signal A 90 degrees) after 180 degrees phase shifting, which is represented as (signal B 0 degree+signal A 90 degrees)+180 degrees, namely, the fourth output 524 is a signal including a signal B of 180 degrees and a signal A of 270 degrees at the same time.

It can be seen from FIG. 5 that, in the case of two input signals, four signals are output, which include four types of phase shifted signals A and signals B. After the antenna element array module radiates the four output signals, four beams in different directions are formed. When the antenna system in the embodiment of the present invention includes multiple Butler matrix modules, more beams in different directions may be output. The above beams cover different areas, and thereby the frequency may be reused and the spectrum utilization rate may be effectively improved.

Compared with the Butler matrix module in FIG. 4, the number of divider components required in the Butler matrix module connected to the TRX array module in FIG. 5 is reduced, and 180 degrees power splitters are used as vector operation networks to perform accurate vector operation in a digital domain, so that the system structure is more simplified and more suitable for integration to reduce the costs.

FIG. 6 is a schematic diagram of another example of the Butler matrix module 14 according to an embodiment of the present invention. The Butler matrix module 14 includes a third 180 degrees power splitter 601 and a fourth 180 degrees power splitter 602.

A first input 611 and a second input 612 of the Butler matrix module 14 are connected to a first input of the third 180 degrees power splitter 601 and a first input of the fourth 180 degrees power splitter 602 respectively.

A first output and a second output of the third 180 degrees power splitter 601 are connected to a first output 621 and a third output 623 of the Butler matrix module respectively.

A first output and a second output of the fourth 180 degrees power splitter 602 are connected to a second output 622 and a fourth output 624 of the Butler matrix module respectively.

When signals being input into the first input and the second input of the Butler matrix module are different transmission signals, signals being output from the first output to the fourth output of the Butler matrix module are the corresponding first signals; or when signals being input into the first input and the second input of the Butler matrix module are different third signals, signals being output from the first output to the fourth output of the Butler matrix module are the corresponding fourth signals. Each transmission signal or each third signal includes two signal components, for example, the first input of the Butler matrix module shown in the figure is a signal component including a signal A and a signal B after 90 degrees phase shifting, and the second input of the Butler matrix module is a signal component including a signal B and a signal A after 90 degrees phase shifting.

For example, as shown in FIG. 6, the first output 621 is a signal including a signal A of 0 degree phase shifting and a signal B of 90 degrees phase shifting at the same time, which is represented as (signal A 0 degree+signal B 90 degrees) in the figure.

The second output 622 is a signal including a signal B of 0 degree phase shifting and a signal A of 90 degrees phase shifting at the same time, which is represented as (signal B 0 degree+signal A 90 degrees) in the figure.

The third output 623 is a signal including (signal A 0 degree+signal B 90 degrees) after 180 degrees phase shifting, which is represented as (signal A 0 degree+signal B 90 degrees)+180 degrees, namely, the third output 623 is a signal including a signal A of 180 degrees and a signal B of 270 degrees at the same time.

The fourth output 624 is a signal including (signal B 0 degree+signal A 90 degrees) after 180 degrees phase shifting, which is represented as (signal B 0 degree+signal A 90 degrees)+180 degrees, namely, the fourth output 624 is a signal including a signal B of 180 degrees and a signal A of 270 degrees at the same time.

It can be seen from FIG. 6 that, in the case of two input signals, four signals are output, which include four types of phase shifted signals A and signals B. After the antenna element array module radiates the four output signals, four beams in different directions are formed. When the antenna system in the embodiment of the present invention includes multiple Butler matrix modules, more beams in different directions may be output. The above beams cover different areas, and thereby the frequency may be reused and the spectrum utilization rate may be effectively improved.

Compared with the Butler matrix module shown in FIG. 5, the Butler matrix module in FIG. 6 has changes in signals, and when a transmission signal includes two signal components, the signal components have undergone phase shifting performed by the TRX array module; therefore, the 90 degrees 3 dB hybrid may be omitted, so that the structure of the Butler matrix module is further simplified and more suitable for integration to reduce the costs.

An embodiment of the present invention further provides a base station, which includes the antenna system in the embodiment of the present invention.

An embodiment of the present invention further provides a system, which includes the above base station.

Persons of ordinary skill in the art should appreciate that, in combination with the examples described in the embodiments herein, units and algorithm steps can be implemented by electronic hardware, or a combination of computer software and electronic hardware. Whether the functions are executed by hardware or software depends on the particular applications and design constraint conditions of the technical solutions. Persons skilled in the art can use different methods to implement the described functions for every particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus, and method may be implemented in other modes. For example, the described apparatus embodiments are merely exemplary. For example, the unit division is merely logical function division and can be other division in actual implementation. For example, multiple units or components can be combined or integrated into another system, or some characteristics can be ignored or not performed. In addition, the displayed or discussed mutual couplings or direct couplings or communication connections are implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, a network device, and the like) to execute all or part of the steps of the method described in the embodiment of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing descriptions are merely exemplary embodiments of the present invention, but not intended to limit the protection scope of the present invention. Any variation or replacement made by persons skilled in the art without departing from the spirit of the present invention shall fall within the protection scope of the present invention. Therefore, the protection scope of the present invention shall be subject to the appended claims.

What is claimed is:

1. An antenna system, comprising a transceiver (TRX) array module, an antenna element array module, a feeding network module and a Butler matrix module, wherein the TRX array module comprises a plurality of active TRX submodules and is configured to generate transmission signals that have undergone digital beam forming which make a beam, output from the antenna element array module, have an adjustable tilt, wherein the number of the active TRX submodules is M×N, where M is the number of the active TRX submodules in the horizontal direction, N is the number of the active TRX submodules in the vertical direction, M and N are positive integers greater than or equal to 2;

the antenna element array module comprises a plurality of antenna elements and is configured to transmit the transmission signals, wherein the number of the antenna elements is A×B, where A is the number of elements in the horizontal direction, B is the number of elements in the vertical direction, A≥M, B≥N, and A and B are positive integers greater than or equal to 2;

the feeding network module is configured to form a vertical beam characteristic of the antenna element array module before the antenna element array module transmits the transmission signals; and the Butler matrix module is configured to form a horizontal beam characteristic of the antenna element array module before the antenna element array module transmits the transmission signals;

wherein the TRX array module comprising the M×N active TRX submodules connects to the antenna element array module comprising the M×N antenna elements through the feeding network module and the Butler matrix module; and wherein a connection among the modules in the antenna system comprises that:

the TRX array module is configured to send the transmission signals to an input port of the Butler matrix module;

the Butler matrix module is configured to generate first signals through processing the transmission signals and to send the first signals to an input port of the feeding network module through an output port of the Butler matrix module; and the feeding network module is configured to generate second signals through processing the first signals and to send the second signals to the antenna element array module through an output port of the feeding network module; and wherein the Butler matrix module comprises a first input port, a second input port and a first output port to a fourth output port, and comprises a third 180 degrees power splitter and a fourth 180 degrees power splitter, wherein the first input port and the second input port of the Butler matrix module are respectively connected to a first input port of the third 180 degrees power splitter and a first input port of the fourth 180 degrees power splitter;

a first output port and a second output port of the third 180 degrees power splitter are respectively connected to the first output port and the third output port of the Butler matrix module;

a first output port and a second output port of the fourth 180 degrees power splitter are respectively connected to the second output port and the fourth output port of the Butler matrix module; and signals being input into the first input port of the Butler matrix module comprise a first transmission signal and a second transmission signal with 90 degrees phase shifting, and signals being input into the second input port of the Butler matrix module comprise the second transmission signal and the first transmission signal with 90 degrees phase shifting, and signals being output from the first output port to the fourth output port of the Butler matrix module are the first signals respectively corresponding to the input signals.

2. The antenna system according to claim 1, wherein the antenna system comprises N Butler matrix modules and feeding network modules the number of which is the same as that of output ports of one Butler matrix module, a total number of input ports of the feeding network modules is equal to a total number of output ports of the Butler matrix modules, the number of input ports of each Butler matrix module is equal to M, the number of input ports of each feeding network module is equal to N and the number of output ports of each feeding network module is equal to B.

3. The antenna system according to claim 1, wherein the feeding network module further comprises:

a phase shifter, configured to change amplitude-phase characteristics of signals generated based on the transmission signals by the feeding network in an analog manner, and form the vertical beam characteristic of the antenna element array module.

4. The antenna system according to claim 1, wherein the transmission signals comprise one or more signal components of a signal.

5. The antenna system according to claim 1, further comprising:

a channel calibration module, configured to calibrate amplitude-phase characteristics of the transmission signals to be output by the TRX array module.

6. An antenna system, comprising a transceiver (TRX) array module, an antenna element array module, a feeding network module and a Butler matrix module, wherein the TRX array module comprises a plurality of active TRX submodules and is configured to generate transmission signals that have undergone digital beam forming which make a beam, output from the antenna element array module, have an adjustable tilt, wherein the number of the active TRX submodules is M×N, where M is the number of the active TRX submodules in the horizontal direction, N is the number of the active TRX submodules in the vertical direction, M and N are positive integers greater than or equal to 2;

the antenna element array module comprises a plurality of antenna elements and is configured to transmit the transmission signals, wherein the number of the antenna elements is A×B, where A is the number of elements in the horizontal direction, B is the number of elements in the vertical direction, A≥M, B≥N, and A and B are positive integers greater than or equal to 2;

the feeding network module is configured to form a vertical beam characteristic of the antenna element array module before the antenna element array module transmits the transmission signals; and the Butler matrix module is configured to form a horizontal beam characteristic of the antenna element array module before the antenna element array module transmits the transmission signals;

wherein the TRX array module comprising the M×N active TRX submodules connects to the antenna element array module comprising the M×N antenna elements through the feeding network module and the Butler matrix module; and wherein a connection among the modules in the antenna system comprises that:

the TRX array module is configured to send the transmission signals to an input port of the feeding network module;

the feeding network module is configured to generate third signals through processing the transmission signals and to send the third signals to an input port of the Butler matrix module through an output port of the feeding network module; and the Butler matrix module is configured to generate fourth signals through processing the third signals and to send the fourth signals to the antenna element array module through an output port of the Butler matrix module; and wherein the Butler matrix module comprises a first input port, a second input port and a first output port to a fourth output port, and comprises a third 180 degrees power splitter and a fourth 180 degrees power splitter, wherein the first input port and the second input port of the Butler matrix module are respectively connected to a first input port of the third 180 degrees power splitter and a first input port of the fourth 180 degrees power splitter;

a first output port and a second output port of the third 180 degrees power splitter are respectively connected to the first output port and the third output port of the Butler matrix module;

a first output port and a second output port of the fourth 180 degrees power splitter are respectively connected to the second output port and the fourth output port of the Butler matrix module;

signals being input into the first input port of the Butler matrix module comprise a first third signal and a second third signal with 90 degrees phase shifting, and signals being input into the second input port of the Butler matrix module comprise the second third signal and the first third signal with 90 degrees phase shifting, signals being output from the first output port to the fourth output port of the Butler matrix module are the fourth signals respectively corresponding to the input signals.

7. The antenna system according to claim 6, wherein the antenna system comprises M feeding network modules and Butler matrix modules the number of which is the same as that of output ports of one feeding network module, a total number of input ports of the Butler matrix modules is equal to a total number of output ports of the feeding network modules, the number of input ports of each feeding network module is equal to N, the number of input ports of each Butler matrix module is equal to M and the number of output ports of each Butler matrix module is equal to A.

8. The antenna system according to claim 7, wherein when M=N=2, A=4, and B=12, the antenna system comprises:

one 2×2 TRX array module, one 4×12 antenna element array module, two feeding network modules and six Butler matrix modules, wherein the number of the input ports of each feeding network module is 2 and the number of the output ports of each feeding network module is 6, the number of the input ports of each Butler matrix module is 2 and the number of the output ports of each Butler matrix module is 4.

9. The antenna system according to claim 6, wherein the transmission signals comprise one or more signal components of a signal.

10. The antenna system according to claim 6, further comprising:

a channel calibration module, configured to calibrate amplitude-phase characteristics of the transmission signals to be output by the TRX array module.

11. A base station, comprising an antenna system, wherein the antenna system comprises a transceiver (TRX) array module, an antenna element array module, a feeding network module and a Butler matrix module, wherein the TRX array module comprises a plurality of active TRX submodules and is configured to generate transmission signals that have undergone digital beam forming which make a beam, output from the TRX array module, have an adjustable tilt, wherein the number of the active TRX submodules is M×N, where M is the number of the active TRX submodules in the horizontal direction, N is the number of the active TRX submodules in the vertical direction, M and N are positive integers greater than or equal to 2;

the antenna element array module comprises a plurality of antenna elements and is configured to transmit the transmission signals, wherein the number of the antenna elements is A×B, where A is the number of elements in the horizontal direction, B is the number of elements in the vertical direction, A≥M, B≥N, and A and B are positive integers greater than or equal to 2;

the feeding network module is configured to form a vertical beam characteristic of the antenna element array module before the antenna element array module transmits the transmission signals; and the Butler matrix module is configured to form a horizontal beam characteristic of the antenna element array module before the antenna element array module transmits the transmission signals;

wherein the TRX array module comprising the M×N active TRX submodules is connected to the antenna element array module comprising the M×N antenna elements through the feeding network module and the Butler matrix module; and wherein a connection among the modules in the antenna system comprises that:

the TRX array module is configured to send the transmission signals to an input port of the Butler matrix module;

the Butler matrix module is configured to generate first signals through processing the transmission signals and to send the first signals to an input port of the feeding network module through an output port of the Butler matrix module; and the feeding network module is configured to generate second signals through processing the first signals and to send the second signals to the antenna element array module through an output port of the feeding network module; and wherein the Butler matrix module comprises a first input port, a second input port and a first output port to a fourth output port, and comprises a third 180 degrees power splitter and a fourth 180 degrees power splitter, wherein the first input port and the second input port of the Butler matrix module are respectively connected to a first input port of the third 180 degrees power splitter and a first input port of the fourth 180 degrees power splitter;

a first output port and a second output port of the third 180 degrees power splitter are respectively connected to the first output port and the third output port of the Butler matrix module;

a first output port and a second output port of the fourth 180 degrees power splitter are respectively connected to the second output port and the fourth output port of the Butler matrix module;

signals being input into the first input port of the Butler matrix module comprise a first transmission signal and a second transmission signal with 90 degrees phase shifting, and signals being input into the second input port of the Butler matrix module comprise the second transmission signal and the first transmission signal with 90 degrees phase shifting, and signals being output from the first output port to the fourth output port of the Butler matrix module are the first signals respectively corresponding to the input signals.

12. The antenna system according to claim 11, wherein the feeding network module further comprises:

a phase shifter, configured to change amplitude-phase characteristics of signals generated based on the transmission signals by the feeding network in an analog manner, and form the vertical beam characteristic of the antenna element array module.

13. The antenna system according to claim 11, wherein the transmission signals comprise one or more signal components of a signal.

14. A base station, comprising an antenna system, wherein the antenna system comprises a transceiver (TRX) array module, an antenna element array module, a feeding network module and a Butler matrix module, wherein the TRX array module comprises a plurality of active TRX submodules and is configured to generate transmission signals that have undergone digital beam forming which make a beam, output from the TRX array module, have an adjustable tilt, wherein the number of the active TRX submodules is M×N, where M is the number of the active TRX submodules in the horizontal direction, N is the number of the active TRX submodules in the vertical direction, M and N are positive integers greater than or equal to 2;

the antenna element array module comprises a plurality of antenna elements and is configured to transmit the transmission signals, wherein the number of the antenna elements is A×B, where A is the number of elements in the horizontal direction, B is the number of elements in the vertical direction, A≥M, B≥N, and A and B are positive integers greater than or equal to 2;

the feeding network module is configured to form a vertical beam characteristic of the antenna element array module before the antenna element array module transmits the transmission signals; and the Butler matrix module is configured to form a horizontal beam characteristic of the antenna element array module before the antenna element array module transmits the transmission signals;

wherein the TRX array module comprising the M×N active TRX submodules is connected to the antenna element array module comprising the M×N antenna elements through the feeding network module and the Butler matrix module; and wherein a connection among the modules in the antenna system comprises that:

the TRX array module is configured to send the transmission signals to an input port of the feeding network module;

the feeding network module is configured to generate third signals through processing the transmission signals and to send the third signals to an input port of the Butler matrix module through an output port of the feeding network module; and the Butler matrix module is configured to generate fourth signals through processing the third signals and to send the fourth signals to the antenna element array module through an output port of the Butler matrix module; and wherein the Butler matrix module comprises a first input port, a second input port and a first output port to a fourth output port, and comprises a third 180 degrees power splitter and a fourth 180 degrees power splitter, wherein the first input port and the second input port of the Butler matrix module are respectively connected to a first input port of the third 180 degrees power splitter and a first input port of the fourth 180 degrees power splitter;

a first output port and a second output port of the third 180 degrees power splitter are respectively connected to the first output port and the third output port of the Butler matrix module;

a first output port and a second output port of the fourth 180 degrees power splitter are respectively connected to the second output port and the fourth output port of the Butler matrix module;

signals being input into the first input port of the Butler matrix module comprise a first third signal and a second third signal with 90 degrees phase shifting, and signals being input into the second input port of the Butler matrix module comprise the second third signal and the first third signal with 90 degrees phase shifting, signals being output from the first output port to the fourth output port of the Butler matrix module are the fourth signals respectively corresponding to the input signals.

15. The antenna system according to claim 14, wherein the feeding network module further comprises:

a phase shifter, configured to change amplitude-phase characteristics of signals generated based on the transmission signals by the feeding network in an analog manner, and form the vertical beam characteristic of the antenna element array module.

16. The antenna system according to claim 14, wherein the transmission signals comprise one or more signal components of a signal.

* * * * *